United States Patent [19]

Wada

[11] Patent Number: 4,991,158
[45] Date of Patent: Feb. 5, 1991

[54] OPTICAL INFORMATION RECORDING AND REPRODUCING APPARATUS

[75] Inventor: Akira Wada, Kyoto, Japan

[73] Assignee: Mitsubishi Denki Kabushiki Kaisha, Tokyo, Japan

[21] Appl. No.: 319,523

[22] Filed: Mar. 6, 1989

[30] Foreign Application Priority Data

Mar. 11, 1988 [JP] Japan .................................. 63-56173
May 31, 1988 [JP] Japan ................................ 63-135143

[51] Int. Cl.$^5$ ............................................ G11B 13/04
[52] U.S. Cl. ...................................... 369/13; 360/114
[58] Field of Search ................... 369/13, 275.2, 44.37, 369/44.38; 360/59, 114; 365/122

[56] References Cited

U.S. PATENT DOCUMENTS

| | | | |
|---|---|---|---|
| 4,477,852 | 10/1984 | Ota et al. | 360/114 |
| 4,566,088 | 1/1986 | Yoshida et al. | 369/44.38 |
| 4,686,661 | 8/1987 | Isaka | 360/114 X |
| 4,805,043 | 2/1989 | Doyle | 360/114 X |

OTHER PUBLICATIONS

*High Speed Overwritable Magneto–Optic Recording,* Takeshi Nakao et al, Japanese, Journal of Applied Physics, vol. 26 (1987) Supplement 26-4, pp. 149 to 154.
High Density Magneto–Optical Disc Capable of Overwriting by Magnetic Field Modulation, Ryo Ando et al, Japanese Society of Electronics, Information, and Communication Engineers, Technical Research Report MR87-37 Nov. 1987, pp. 13–20.

*Primary Examiner*—Stuart S. Levey
*Assistant Examiner*—James E. Tomessini
*Attorney, Agent, or Firm*—Wolf, Greenfield & Sacks

[57] ABSTRACT

An optical information recording and reporducing apparatus for recording and reproducing information optically against recording material, includes means for generating a first light beam for reproducing and erasing information which is previously recorded in the recording material, and means for providing a second light beam for recording new information into the recording material, and irradiation of the first light beam and the second light beam to an arbitrary point on the recording material is conducted in the above-mentioned order. Another type recording and reproducing apparatus includes an optical head which introduces a light beam onto optical information recording material and takes out a reproduced signal from the optical information recording material, means for applying a magnetic field whose polarity is in accordance with writing-in information to the recording material, and means for demodulating the signal reproduced from the optical head, and the light beam is made have no modulation and the level thereof is set at a level which gives a rise to above Curie temperture which is required for the writing-in at the writing-in operation, and the signal reproduced from the recorded information by the optical head direct before rewriting is demodulated and monitored.

9 Claims, 7 Drawing Sheets

F I G .5.
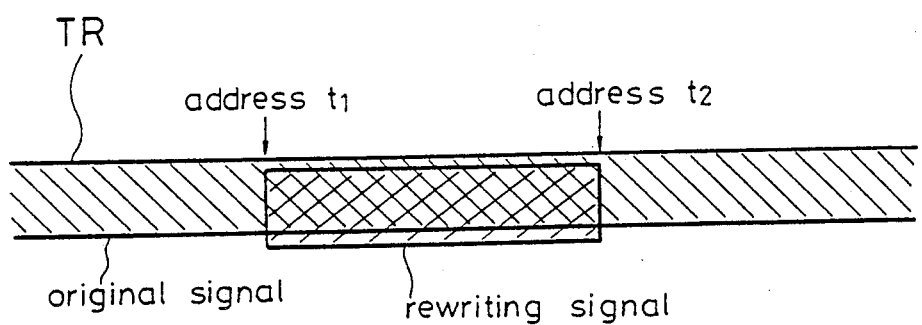
F I G .7.
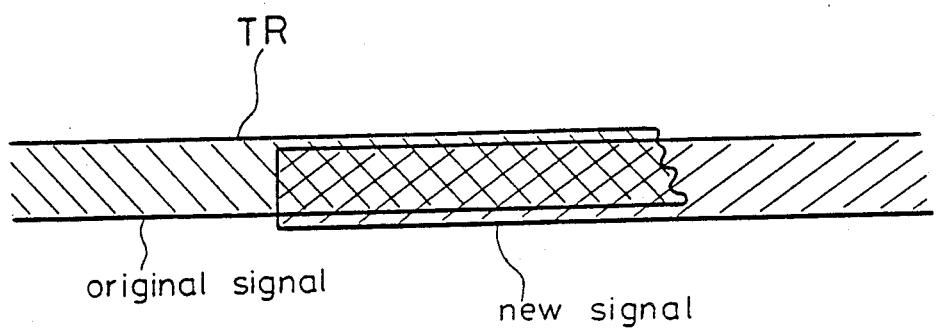

F I G .8.
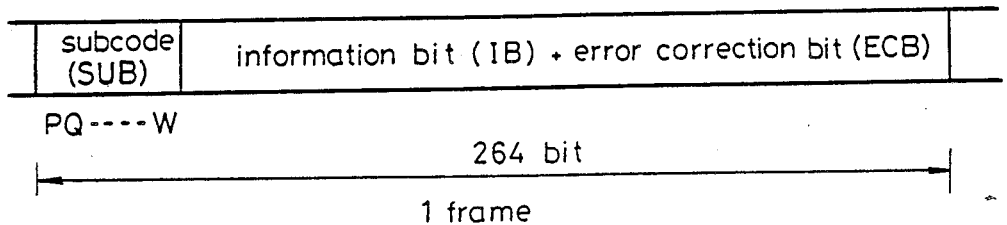
F I G .9.
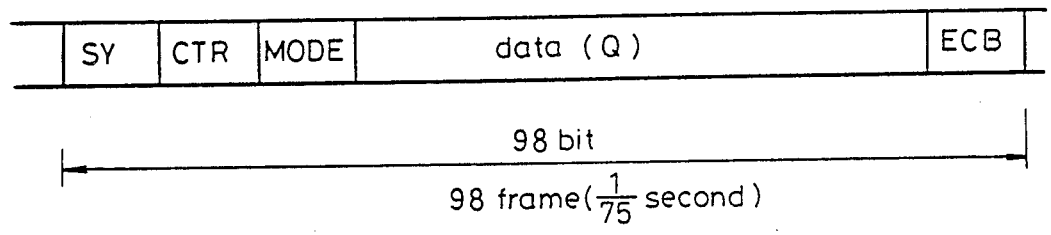

OPTICAL INFORMATION RECORDING AND REPRODUCING APPARATUS

FIELD OF THE INVENTION

The present invention relates to an optical information recording and reproducing apparatus which can be used as a digital audio disk apparatus, and more particularly, to that conducting rewriting of information, in such as an opto-magnetic disk or a phase-change optical head.

BACKGROUND OF THE INVENTION

A digital audio disk oriented for use in only reproduction is commercialized as a so-called "compact disk" (hereinafter referred to as "CD") and a development of those capable of conducting rewriting of information is advancing. As a rewritable optical disk, there is one which utilizes opto-magnetic effect. This disk utilizes in the recording the nature of material that when the material is heated up to above Curie temperature by such as laser light, the coercive force becomes almost zero and the magnetization can be inverted by a small external magnetic field, and utilizes in the reproduction the nature of material arising Kerr effect in which the polarization plane of incident laser light is rotated by the direction of magnetization.

As another rewritable optical disk, those utilizing the change in phase between crystal phase and non-crystal phase is known.

By the way, in conducting recording or editing in such as a music studio, it is quite rare that all performers gather with together and conduct performances for recording at the same time. Generally, in such case, firstly recording of part of rhythm section such as drums is conducted, thereafter recording of part of melody section is conducted, and finally recording of part of chorus section is conducted, thereby completing a tune. Then, the performance of the respective part is conducted with listening to the performances of the other parts which are recorded prior. Accordingly, an apparatus for conducting recording and editing in such as a music studio, has to be provided with a function of recording new information with multiplying the same on the previously recorded information along with reproducing the previously recorded information.

A prior art optical information recording and reproducing apparatus provided with such a function is disclosed in Japanese Laid-open Patent Publication No. 63-306536.

FIG. 2 shows a state where a desired track in information recording material is irradiated by a light beam sequence and FIG. 3 shows a functional diagram for explaining the recording and reproducing operation.

In these figures, a laser beam 14 as a first light beam exhibits a function of reproducing information which is already recorded in a disk as an information recording material. A laser beam 15 as a second light beam exhibits a function of recording new information on the information recording material. A laser beam 16 as a third light beam exhibits a function of erasing information which is reproduced by the first light beam 14. These three kinds of light beams are arranged on a predetermined track 21 in the order of first, third, and second light beams 14, 16, and 15 along the advancing direction of disk A. Furthermore, noticing a predetermined position of the disk, the time interval from timing when the first light beam 14 is irradiated to timing when the second light beam 15 is irradiated is $t_H$.

In FIG. 3, driving means for driving the disk as information recording material, an optical system for guiding light beam, detection means for detecting a reproduced signal or control signals, and servo-control means may be constituted by known devices and they are not shown here for simplification.

A reproduced signal 41 reproduced by the first light beam 14 is subjected to deinterleaving processing and error correction decoding processing by the decoder circuit 42. The reproduced signal subjected to such processing is mixed with an external signal 44 which is applied from the outside in the mixing circuit 40. Thereafter, the signal subjected to this mixing processing is subjected to coding processing and interleaving processing in the encoder circuit 48, and the signal is rerecorded on the disk as a new recording signal 49 by the second light beam 15. Then, if it is supposed that the required time for the processing at the decoder circuit 42 is $t_1$ and the required time for the processing at the encoder circuit 48 is $t_2$, the time interval $t_H$ between the operation timing of the first light beam 14 and the operation timing of the second light beam 15 may be set as in the following.

$$t_H \geq t_1 + t_2$$

Furthermore, because the third light beam for erasing 16 is located between the first light beam 14 and the second light beam 15, the recording information at a predetermined position of the disk 2 has already been erased when a new recorded signal 49 is to be recorded.

The manner of operation of the prior art device will be described in detail.

The mixing circuit 40 is constituted by a first attenuator 43 for attenuating the decoded reproduced signal 41, a second attenuator 45 for attenuating an external signal 44 which is newly added from the outside, and an adder 46 for adding the output signals from the first and second attenuators 43 and 45. Herein, the attenuation quantity of the first attenuator 43 and the attenuation quantity of the second attenuator 45 are adjusted to vary complementarily with each other, that is, with holding a relation therebetween.

For example, in recording information to a new disk, if it is supposed that the attenuation quantity of the first attenuator 43 is made maximum and the attenuation quantity of the second attenuator 45 is made zero, as a result of the addition by the adder 46, only the external signal 44 appears at the output of the adder 46 and this is subjected to an encoding processing by the encoder circuit 48 and the output thereof is recorded by the second light beam 15.

Next, to thus recorded information, another external signal can be newly added. In such case, in a state where the attenuation quantity of the first attenuator 43 is made zero and the attenuation quantity of the second attenuator 45 is made maximum, the reproduction operation is started. Then, the reproduced signal 41 is subjected to an error correction processing by the decoder circuit 42, and it is subjected to an encoding processing by the encoder circuit 48 as it is, and it is recorded to the original position on the disk by the second light beam 15. Then, by changing the attenuation quantity of the first and second attenuators 43 and 45 properly at the timing when the external signal 44 is to be recorded additionally, a signal which is obtained by mixing the reproduced signal 41 from the disk and the external signal 44 at a desired ratio is output at the output of the adder 46. Then, by properly adjusting the changing speeds of the attenuation quantity of the first and second attenuators 43 and 45, a desired cross-fade property (one of the two inputs is faded-in and the other is faded-out) is obtained. Herein, the above described mixing state can be confirmed by the monitor output 47.

In the prior art optical information recording and reproducing apparatus of such a construction, three light beams are required for recording, reproduction, and erasing of information. Accordingly, these three light beams have to be controlled in their position determination accurately onto the same track on the disk, and thus the circuits required therefor increase and accompanying therewith the reliability of the apparatus itself is lowered. Furthermore, the optical head for generating the light beam is of high cost, and the increase in the number of light beams leads to an increase in the production cost of the apparatus itself, thereby resulting in an obstruction in the production thereof.

Another prior art will be described as follows.

In an opto-magnetic disk, there is a magnetic field modulation system as a method of recording new information into a disk which has already recorded information. In this system, while continuously irradiating laser light to the opto-magnetic disk thereby to heat the recording material up to above Curie temperature to erase the information, a magnetic field is applied to the opto-magnetic disk by the magnetic field applying head with making the polarity of the magnetic field, that is, N or S in accordance with the information "1" or "0" of the writing-in information, whereby a new writing-in bit is recorded in an instance when the recording material is cooled down to below Curie temperature.

An idea of obtaining a rewritable digital audio disk apparatus for recording and reproducing audio signals in CD format using this system is proposed in such as Technical Search Report MR 87-37 of Japanese Society of Electronics, Information, and Communication Engineers.

The fundamental construction of a rewritable digital audio disk apparatus utilizing a magnetic field modulation system will be described with reference to FIG. 6.

In FIG. 6, reference numeral 1 designates an opto-magnetic disk which records information in accordance with the magnetization direction. An optical head 2 is provided to reproduce or erase information recorded in the opto-magnetic disk 1. A light beam comprising laser light 3 emitted from the optical head 2 is irradiated to the opto-magnetic disk 1 through an objective lens actuator 4. This actuator 4 is provided to adjust the focus and position of the light beam 3 emitted from the optical head 2 so that the light beam 3 is correctly irradiated to the opto-magnetic disk 1. An analogue digital converter 5 (hereinafter referred to as "A/D converter") is provided to convert an input audio signal to a 16 bit parallel digital signal. A CD encoder 6 is provided to conduct conversion of digital signal from the A/D converter 5 to a signal which can be recorded into the opto-magnetic disk 1 as a signal equivalent to CD format signal. A magnetic field applying head 7 is provided to apply a magnetic field in a direction in accordance with the signal from the CD encoder 6 thereby to record the signal. A CD decoder 8 is provided to convert the signal reproduced from the optical head 2 to a 16 bit parallel digital signal. A digital to analogue converter (hereinafter referred to as "D/A converter") is provided to convert the digital signal from the CD decoder 8 to an audio signal.

The device will operate as follows. Herein, it is supposed that a tracking guide groove is etched in the opto-magnetic disk 1.

First of all, in the recording, the optical head 2 is moved to a position where information is to be recorded and the light beam 3 is correctly irradiated to the opto-magnetic disk 1 with focused and correctly positioned by the objective lens actuator 4. Next, an audio signal to be recorded is input to the A/D converter 5. The signal input to the A/D converter 5 is converted into a digital signal and this digital signal is encoded by the CD encoder 6 to be supplied to the magnetic field applying head 7 as a signal equivalent to CD format signal. The magnetic field applying head 7 applies an external magnetic field to the opto-magnetic disk 1 with making the polarity of the magnetic field, that is, N or S in accordance with the signal from the CD encoder 6. At the same time, the intensity of the light beam 3 from the optical head 2 is increased and thus the recording is started.

When the recording is to be stopped, the intensity of the light beam 3 is lowered, and a signal is stopped to be applied to the magnetic field applying head 7, whereby the generation of a magnetic field is halted.

When the reproduction is to be conducted, the optical head 2 is moved to the position of the recorded information, and similarly as in the recording, the light beam 3 is projected onto the opto-magnetic disk 1 by the function of the objective lens actuator 4 so as to adjust the focus and the track position, and the signal is reproduced from the optical head 2. The reproduced signal is sent out to the CD decoder 8 and is converted into a 16 bit parallel digital signal, and finally, an audio signal is obtained at the output of the D/A converter 9.

Next, the operation in a case where a new signal is to be written in into a disk which has already recorded information will be described.

In such case, the rewriting of a new signal is conducted from a point in the way of the original signal as shown in FIG. 7. First of all, the output signal is monitored in the reproduction state, and the reproduction is conducted to a required position, whereby the optical head 2 is moved to a position where the rewriting is to be conducted. Next, a signal to be recorded is input and this signal is sent to the magnetic field applying head 7 and a magnetic field is generated in accordance therewith. At the same time, the intensity of the light beam 3 is increased and the recording is started. Thus, the rewriting operation is conducted.

The recording and reproduction are conducted as described above in this second prior art device. When only a portion is to be rewritten or a signal is to be inserted into only a portion, especially when only the conclusion point of the portion to be rewritten is clear and the portion beyond the conclusion point is to be remained in such prior art device, there is a problem in that the position of the conclusion point is difficult to be precisely determined although the starting point of the rewriting may be arbitrary to some degree. Therefore, there may be a possibility that required data would be erroneously deleted.

As a method of solving this problem, it is conceived to provide another optical head prior to the presently existing optical head 2 and to control the recording by the behind optical head 2 with confirming the reproduced signal before rewriting by the prior optical head 2. However, this method requires a construction capable of moving two optical systems correctly onto the same track on the disk, thereby resulting in problems in view of cost and reliability.

SUMMARY OF THE INVENTION

It is an object of the present invention to provide an optical information recording and reproducing apparatus capable of reducing the number of light beams to two and also having a function equal to that of the first prior art device.

It is another object of the present invention to provide such an apparatus of magnetic field modulation system capable of realizing rewriting of only a portion of optical disk by utilizing only one optical head.

Other objects and advantages of the present invention will become apparent from the detailed description given hereinafter; it should be understood, however, that the detailed description and specific embodiment are given by way of illustration only, since various changes and modifications within the spirit and the scope of the invention will become apparent to those skilled in the art from this detailed description.

According to an aspect of the present invention, a first light beam for reproducing and erasing the information which is previously recorded in the recording material and a second light beam for recording new information into the recording material are provided, and the irradiation of light beam to an arbitrary particular point in the recording material is established in an order of the first light beam and subsequently the second light beam. Therefore, the reproduction and erasing of information which is previously recorded in the recording material by the first light beam are conducted at the same time and the mixing of the information with the new information is conducted after the decoding of the reproduced information. Subsequently thereto, a required coding processing is conducted, and thereafter, recording is conducted onto the original position in the recording material by the second light beam.

According to another aspect of the present invention, in an apparatus of magnetic field modulation system a light beam is made have no modulation and the intensity thereof is raised to the level which gives a rise of temperature up to Curie temperature which is required for the rewriting at the rewriting operation, and the signal reproduced from the recorded information by the optical head before rewriting, which is obtained directly before the rewriting is demodulated and monitored. Thus, the rewriting conclusion position can be easily and precisely confirmed.

BRIEF DESCRIPTION OF THE DRAWINGS

FIG. 5 is a diagram showing a state where the recording of a signal into the recording material is conducted, according to a second embodiment of the present invention;

FIG. 7 is a diagram showing a state where the recording of a signal into the recording material is conducted, according to the second prior art device;

FIG. 8 is a diagram showing a frame construction of CD format;

FIG. 9 is a diagram showing the Q channel construction thereof;

DETAILED DESCRIPTION OF THE PREFERRED EMBODIMENT

An embodiment of the present invention will be described in detail with reference to the drawings.

Figure 1:
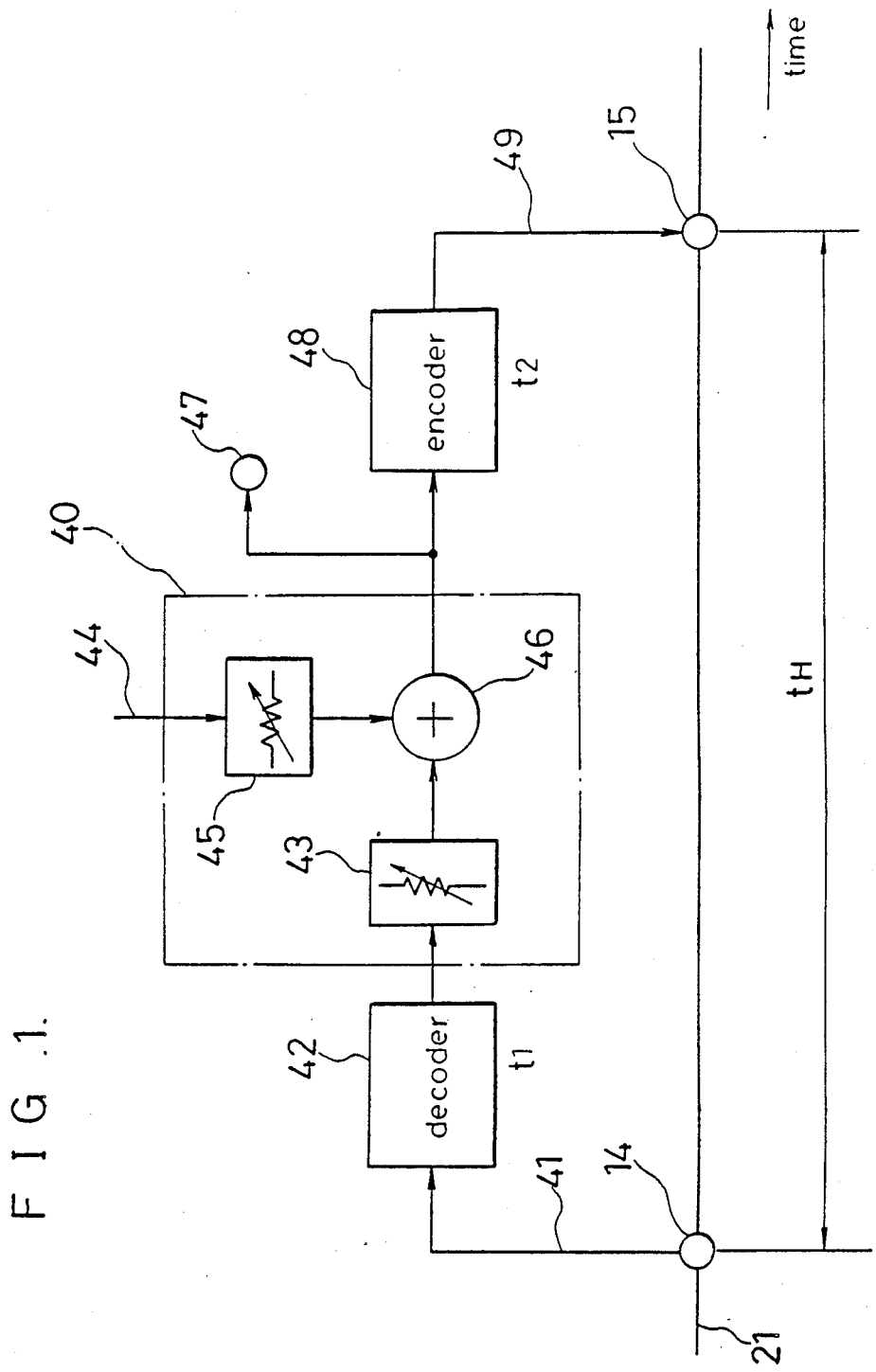
FIG. 1 is a diagram showing a functional construction for explaining the recording and reproducing operation of a optical information recording and reproducing apparatus according to a first embodiment of the present invention.
Figure 2:
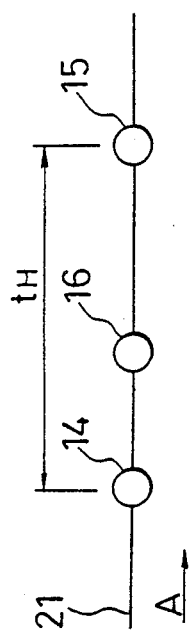
FIG. 2 is a diagram for explaining a state where a light beam sequence is irradiated to a predetermined track in a general optical information recording material.
Figure 3:
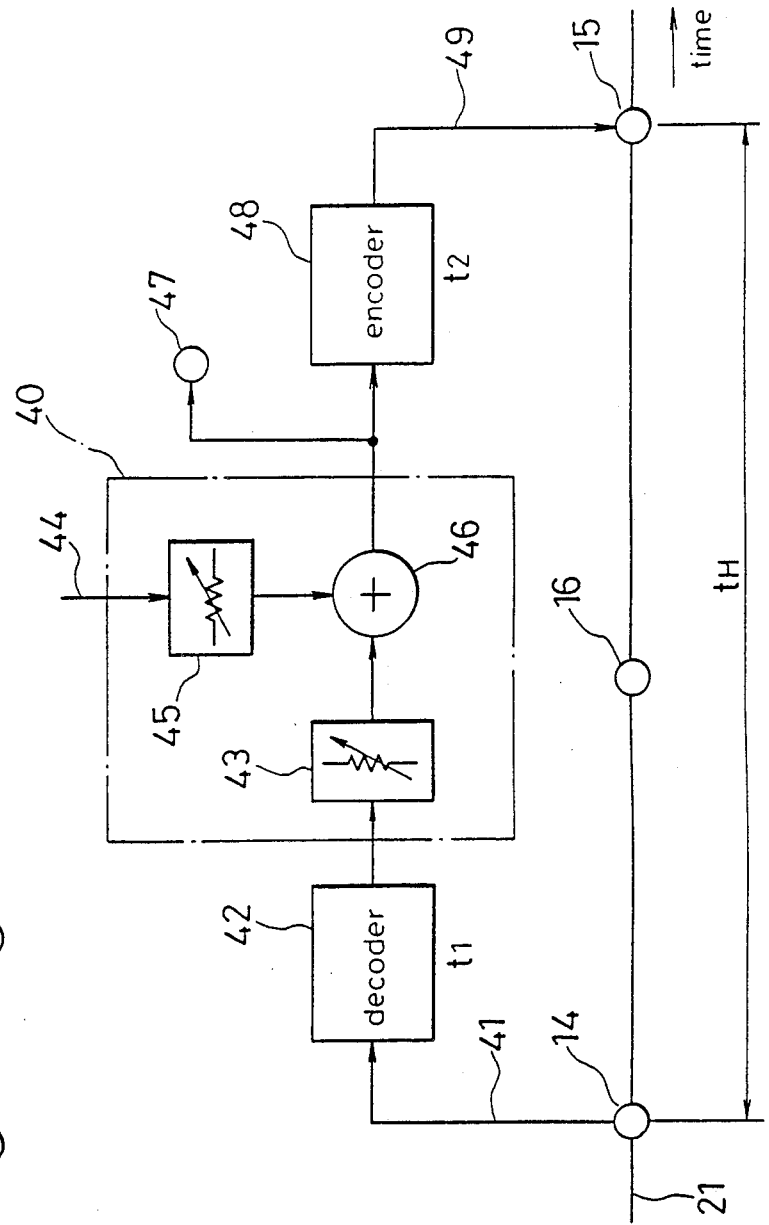
FIG. 3 is a diagram showing a functional construction for explaining the recording and reproducing operation in a first prior art device.

FIG. 1 is a diagram showing a construction of a first embodiment of the present invention. In FIG. 1, reference numeral 14 designates a laser beam as a first light beam, and this functions to reproduce and erase the information which is previously recorded on a predetermined track of a disk as information recording material. Reference numeral 15 designates a laser beam as a second light beam, and this functions to record desired information on a predetermined track of the disk. Furthermore, the time interval between timing when the first light beam 14 is irradiated to the information recording material to timing when the second light beam 15 is irradiated is $t_H$.

Next, the operation of this first embodiment will be described with respect to a case where opto-magnetic recording material is used for the information recording material.

First of all, the principle of operation of reproducing information in a case where opto-magnetic recording material is used, will be described. A light beam which is deflected by a deflector (not shown) inside the optical head is irradiated to a signal train produced on a magnetic film as opto-magnetic information recording material. Thereafter, on the basis of the magnetic Kerr effect, a reflection light as a light beam which is polarized in accordance with the magnetization direction of the irradiated portion is obtained. Thereafter, by a proper beam splitter, this reflected light is splitted from the incident light and is introduced to a light receiving element through a desired photodetector. By doing such, the magnetization direction is detected on the basis of the polarization direction, and information recorded on the opto-magnetic recording material is reproduced.

The principle of operation of erasing the recorded information will be described.

A desired light beam is irradiated to the recorded bit sequence on the opto-magnetic recording material and the temperature of the irradiated portion is raised once up to Curie temperature. Thereafter, a cooling processing is executed to a portion other than the recorded bit portion on the recording material with applying a DC bias magnetic field in the same direction with the magnetization direction. By doing such, required information is erased.

By the way, in an optical head provided with a reproduction function, when a light beam which can heat the material up to Curie temperature is irradiated to the recording material, the point of the recording material where the optical beam is irradiated is not immediately raised up to Curie temperature but the information at the portion where the light beam is irradiated can be reproduced for a predetermined time period. Then, accompanying with the passage of light beam, the temperature is raised up to Curie temperature, and then a cooling processing is executed thereby to erase the information. Herein, the DC bias magnetic field is kept to be applied.

According to such processing, the information can be reproduced and erased by only using an optical beam.

As is understood from the explanation of the principle described above, the bit sequence representing corresponding information on the recording material is erased direct after the information is reproduced by the first light beam 14. This means that the reproduction and erasing of information are conducted approximately at the same time by a light beam.

The operation of the above-described first embodiment will be described more in detail as in the following.

First of all, when a first light beam 14 is irradiated onto the information bit sequence previously recorded on the information recording material, a reproduced signal 41 corresponding to this information is obtained. The recording portion of the irradiated information bit sequence is raised its temperature by the passage of the first light beam 14 and amounts to Curie temperature. Thereafter, through a cooling processing, the recorded information is erased.

By the way, the reproduced signal 41 reproduced by the first optical beam 14 is subjected to deinterleaving processing and error correction decoding processing by the decoder circuit 42. The reproduced signal subjected to such processing is mixed with the external signal 44 which is applied from the outside in the mixing circuit 40. Thereafter, this mixed signal is subjected to coding processing and interleaving processing in the encoder circuit 48, and it is rerecorded on the disk by a second optical beam 15 as a new recording signal 49. If it is supposed that the required time for the processing at the decoder circuit 42 is $t_1$ and the required time for the processing at the encoder circuit 48 is $t_2$, the time interval $t_H$ between the operation point of the first light beam 14 and the operation point of the second light beam 15 is established as in the following.

$$t_H \geq t_1 + t_2$$

Herein, in a special case where $t_H = t_1 + t_2$, the rerecording is conducted to the original portion where the reproduction and erasing of information are conducted.

By doing such, while reproducing previously recorded information, new information is added and mixed with the reproduced information and this mixed information is rerecorded to the original position of the recording material.

While in the above-illustrated first embodiment an opto-magnetic information recording material is used as an information recording material, other information recording material such as those using phase-change material may be adopted with the same effects as described above.

Figure 4:
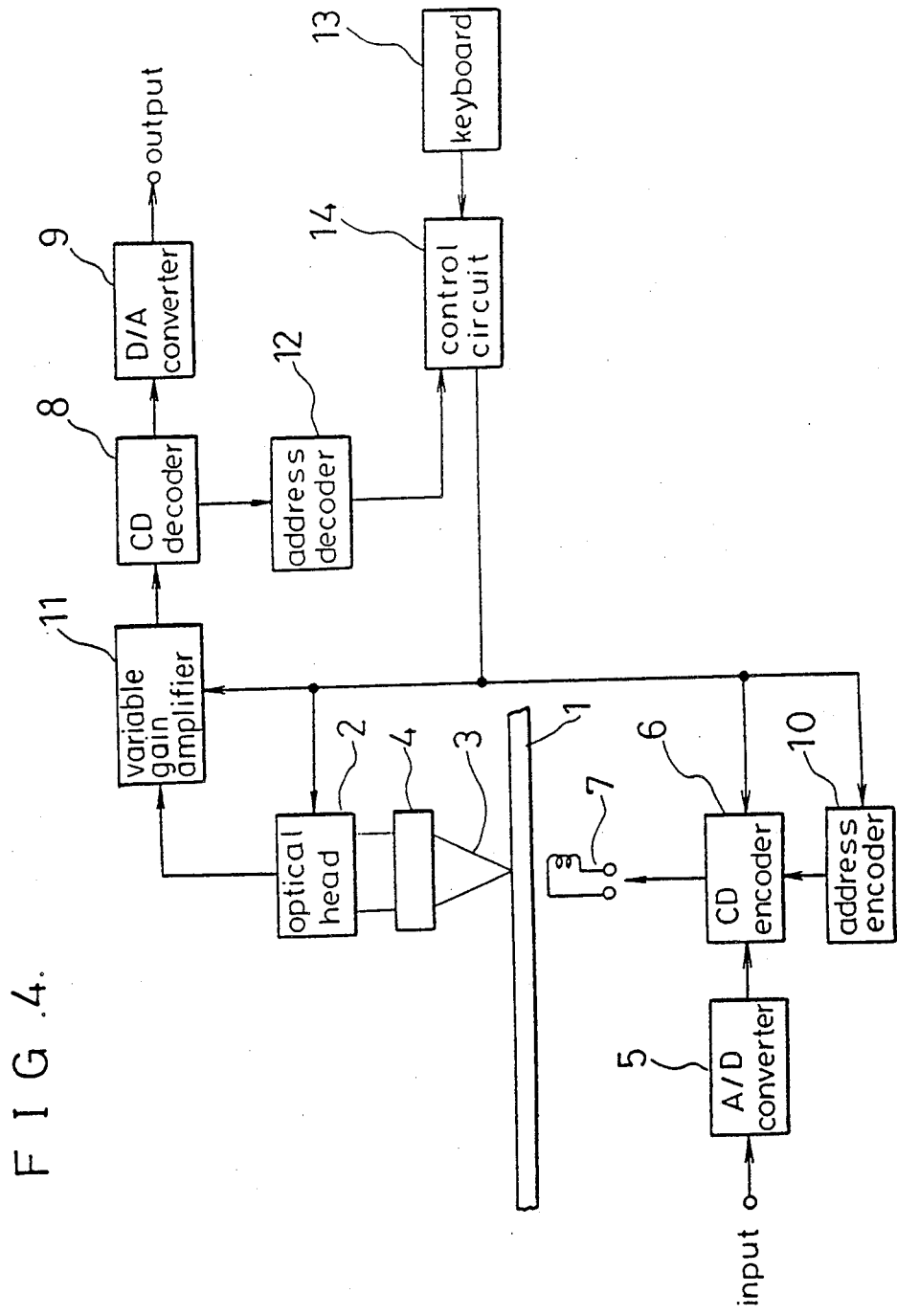
FIG. 4 is a diagram showing an opto-magnetic recording and reproducing apparatus according to a first embodiment of the present invention.
Figure 6:
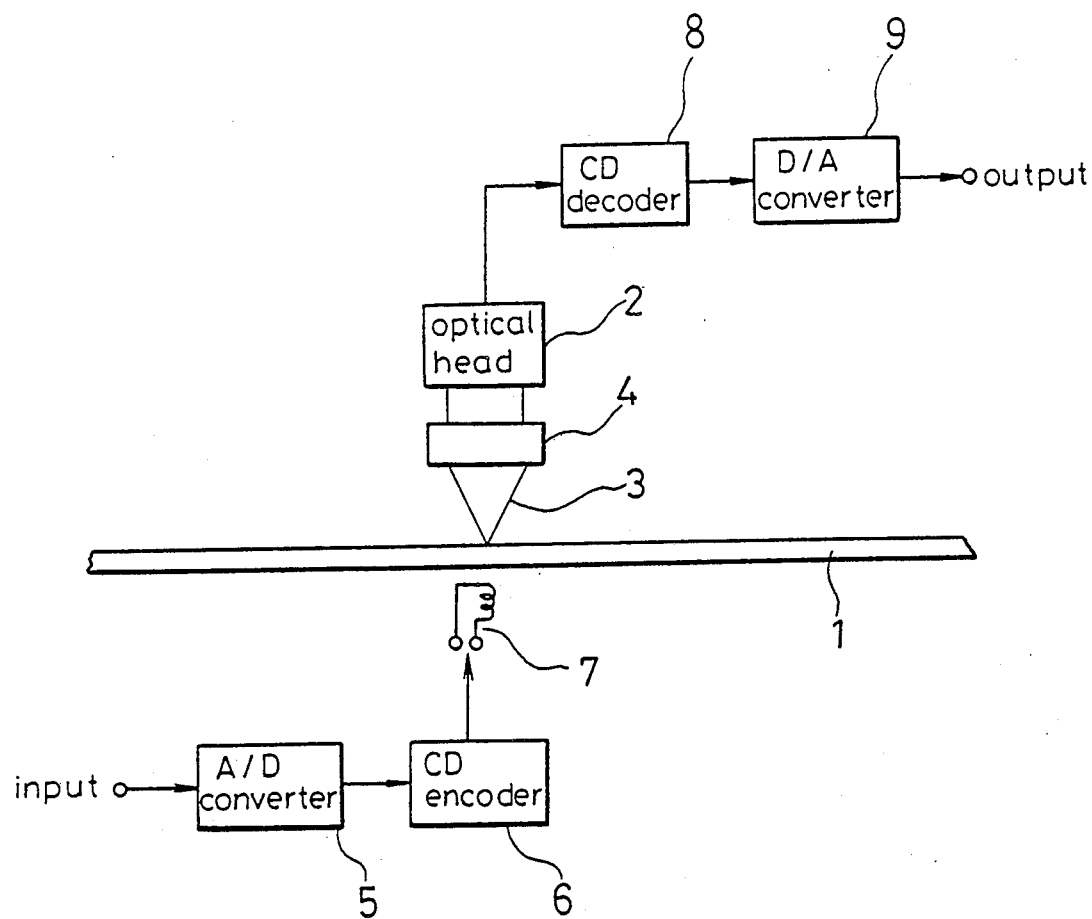
FIG. 6 is a block diagram showing an opto-magnetic recording and reproducing apparatus according to a second prior art.

FIG. 4 shows an opto-magnetic recording and reproducing apparatus according to a second embodiment of the present invention. In FIG. 4, the same reference numerals designate the same or corresponding elements as those shown in FIG. 6. An address encoder 10 is provided to generate a timecode as shown in subcode of CD format. A variable gain amplifier 11 capable of varying the gain thereof is provided to amplify the signal reproduced by the optical head 2. This variable gain amplifier 11 is used to hold the level of the signal to the CD decoder 8 at a constant value even when the intensity of light beam 3 is increased in the rewriting operation. An address decoder 12 is provided to demodulate the timecode from the signal obtained by the CD decoder 8. A keyboard 13 is provided to input instructions for operating the recording and reproducing apparatus of this embodiment. A control circuit 14 is provided to control the apparatus in accordance with the instructions from the keyboard 13 and the information from the address decoder 12.

FIG. 8 shows a frame construction of CD format. In the CD format, respective bits of 8 bits of P, Q, ..., and W in the subcode SUB are respectively assigned to one frame, and respective bit of 98 frames constitute a data. In FIG. 8, IB represents information bit and ECB represents error correction bit. Timecodes are assigned to Q of the subcodes P, Q, ..., W, and the data format thereof of Q channel is shown in FIG. 9. In FIG. 9, SY represents a synchronization pattern, CTR represents a control signal, MODE represents a mode signal, data (Q) represents data, and ECB represents an error correction bit. The data (Q) includes minute, second, and information of the frame (0 to 74).

The above-described embodiment differs from the second prior art device in that a signal before rewriting which is reproduced by the optical head in a state where the light beam intensity is raised up to the rewriting power is utilized in the rewriting operation.

When the light beam is irradiated to an opto-magnetic disk, firstly, the already recorded information is reproduced because the temperature of the recording material is not raised up to Curie temperature immediately after the irradiation. After the temperature of the recording material is raised up to the Curie temperature by the passage of the light beam, only the new information is written-in in accordance with the polarity of the external magnetic field. Accordingly, the signal before rewriting can be obtained even while the rewriting is conducted.

In the description hereinbelow, it is, for simplification, supposed that signals are already recorded in the opto-magnetic disk 1 and that timecodes are also recorded together with the audio digital signal at the recording by the address encoder 10.

Figure 10:
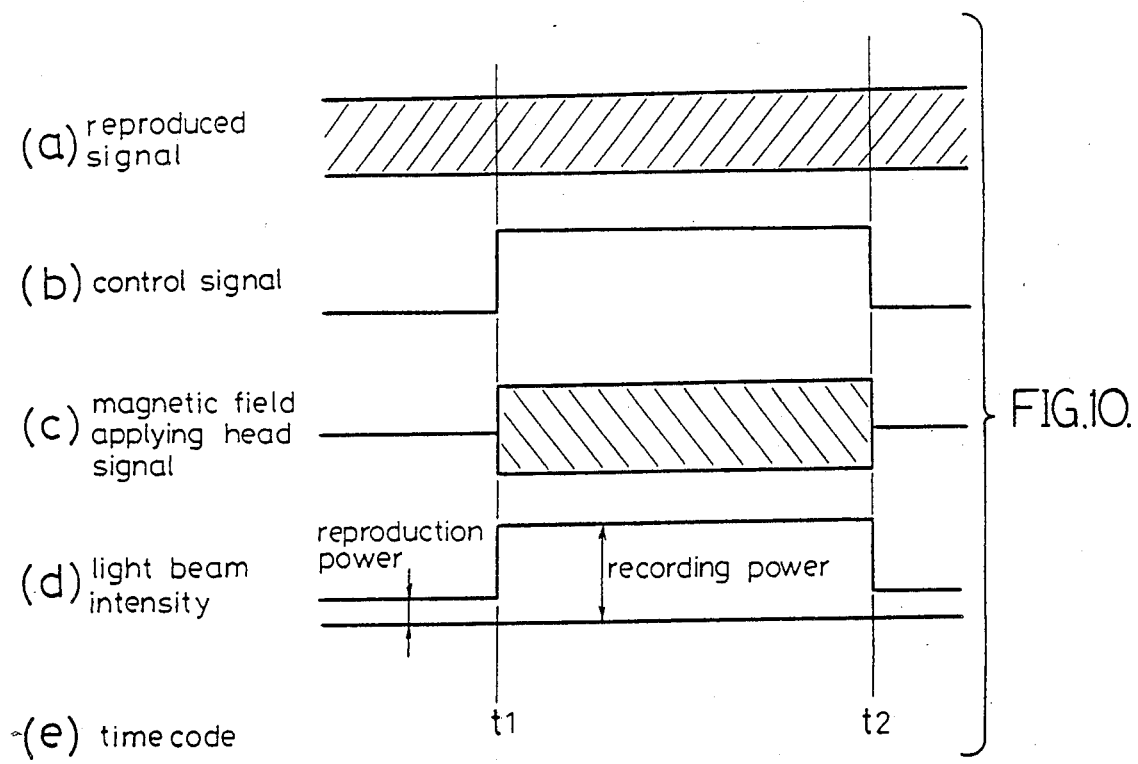
FIG. 10 is a diagram showing an operation timechart of the above-described second embodiment.
Figure 11:
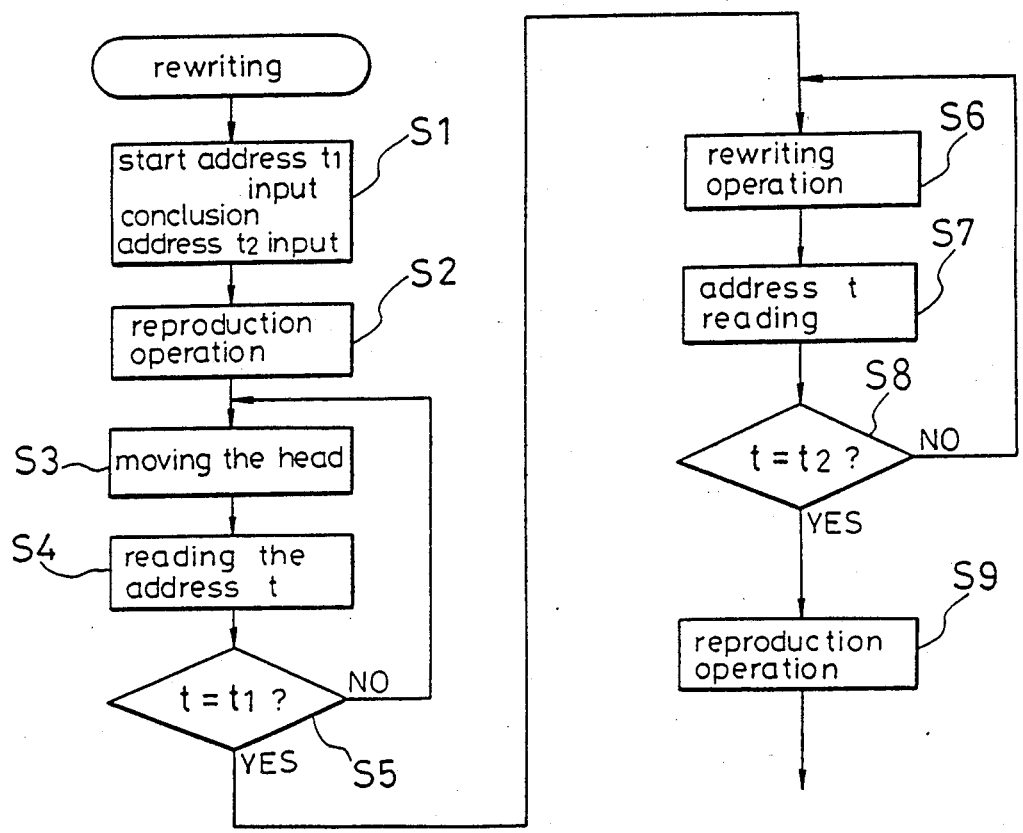
FIG. 11 is a diagram showing an operation flowchart of the above-described second embodiment.

The operation of the rewriting which is conducted to a portion of a track into which information is already recorded as shown in FIG. 5 will be described with reference to the timechart of FIG. 10 and flowchart of FIG. 11.

First of all, when the information from the address $t_1$ to $t_2$ on the track TR of the opto-magnetic disk 1 in which information is already recorded is to be rewritten, rewriting start address $t_1$ and rewriting conclusion address $t_2$ are input to the control circuit 14 from the keyboard 13 (step S1). Next, the reproduction operation is started (step S2), and while moving the head (step S3) and reading the address t (step S4) in the reproduction state (where the light beam intensity is set at the reproduction power), the signal reproduced from the optical head 2 is sent out to the control circuit 14 as an address data through the variable gain amplifier 11, CD decoder 8, and address decoder 12. The address data and the rewriting start address $t_1$ are compared by the control circuit 14 (step S5), and in accordance with the result of that (which is not equal to zero when it is judged "NO" at step S5), the optical head 2 is continued to be moved toward the rewriting start point. When the address has come to the rewriting start address $t_1$ (when it is judged "YES" at step S5), the operation transits to the rewriting operation (step S6). That is, the CD encoder 6 is operated by the control circuit 14 and a signal is sent out to the magnetic field applying head 7, and at the same time the intensity of light beam 3 which is output from the optical head 7 is increased to the recording power. Then, the signal before rewriting is reproduced from the optical head 2 and this signal is sent out to the CD decoder 8 with being made have about the same signal amplitude as that in the reproduction state by the variable gain amplifier 11. The signal from the CD decoder 8 is sent out to the control circuit 14 as an address data through the address decoder 12 (step S7). In the control circuit 14, the address data t and the rewriting conclusion address $t_2$ are compared with each other (step S8), and until the address data t becomes equal to $t_2$ (when it is judged "NO" at step S8), the rewriting operation is continued. When the address data t of the signal reproduced from the optical head 2 has become equal to $t_2$ (when it is judged "YES" at step S8), the intensity of light beam 3 is lowered thereby to stop the rewriting operation, and the device is set at a reproduction state (step S9). Then, the operation of the CD encoder 6 is stopped and the magnetic field applying head 7 is stopped to generate a magnetic field.

While in the above-illustrated second embodiment timecodes are previously recorded in the opto-magnetic disk 1, these timecodes may not be recorded In this case the start and conclusion of the rewriting operation may be judged by an operator with monitoring the output of the D/A converter 9, and the conclusion of the rewriting operation can be realized by inputting an instruction from the keyboard 13 with the same effects as described above.

While in the above-illustrated second embodiment the output signal of the optical head 2 is sent to the next stage through a variable gain amplifier 11, the variable gain amplifier 11 may not be provided when there is no such difference between the output signal level at the usual reproduction and that at the rewriting operation.

While in the above-illustrated second embodiment a digital audio disk apparatus is described, the present invention may be applied to an apparatus which records and reproduces video signals with the same effects as described above.

As is evident from the foregoing description, according to an aspect of the present invention, in an apparatus which records and reproduces information into recording material, a first light beam for producing and erasing the information which is previously recorded and a second light beam for recording new information into the recording material are provided, and the irradiation of the first light beam and the second light beam to an arbitrary particular point on the recording material are conducted in the above-mentioned order. Therefore, the reproduction and erasing of the information which is previously recorded in the recording material are conducted approximately at the same time by the first light beam, and after the decoding of the reproduced information is conducted, mixing of the reproduced information with new information is conducted, and after a required coding processing is further conducted, the processed information is recorded to the original position on the recording material by a second light beam. Accordingly, reproduction, erasing and recording of required information can be precisely conducted by utilizing a small number of light beams.

According to another aspect of the present invention, a light beam is made have no modulation and the intensity thereof is raised to the level which gives a rise of temperature up to Curie temperature which is required for the rewriting at the rewriting operation, and the signal reproduced from the recorded information by the optical head before rewriting, which is obtained directly before the rewriting is demodulated and monitored. Therefore, the rewriting conclusion position can be easily and precisely confirmed and as a result the enhancement in reliability and reduction in cost can be realized.

What is claimed is:

1. An optical information recording and reproducing apparatus for recording and reproducing information optically against recording material, comprising:
   means for generating a first light beam for reproducing and erasing information which is previously recorded in said recording material;
   means for providing a second light beam for recording new information into said recording material; and
   irradiation of said first light beam and said second light beam to an arbitrary particular point on said recording material being conducted in the order of said first light beam and subsequently said second light beam.

2. An optical information recording and reproducing apparatus as defined in claim 1, wherein the time interval between timing when said first light beam is irradiated to said particular point on said recording material to timing when said second light beam is irradiated to said particular point is equal to or larger than the sum of the coding time and decoding time of the digital information which is to be recorded and reproduced.

3. An optical information recording and reproducing apparatus as defined in claim 1, wherein said first light beam is a light beam which is capable of heating said recording material up to Curie temperature required for erasing the recorded information, and the recorded information which is obtained directly before being erased by that the recording material is raised up to Curie temperature, is obtained as a reproduction output.

4. An optical information recording and reproducing apparatus as defined in claim 1, wherein said optical information recording material is an opto-magnetic recording material.

5. An optical information recording and reproducing apparatus as defined in claim 2, wherein said optical information recording material is an opto-magnetic recording material.

6. An optical information recording and reproducing apparatus as defined in claim 3, wherein said optical information recording material is an opto-magnetic recording material.

7. An optical information recording and reproducing apparatus comprising:
   an optical head provided with an optical system which introduces a light beam onto an optical information recording material and takes out a reproduced signal from said optical information recording material;
means for applying a magnetic field whose polarity is in accordance with writing-in information to said recording material;
demodulation means for demodulating the reproduced signal reproduced by said optical head;
said light beam being made having no modulation and the level thereof being set at a level which gives a rise to above Curie temperature which is required for the writing-in at the writing-in operation; and
a signal reproduced from the recorded information by said optical head before rewriting which is obtained directly before the rewriting being demodulated and monitored.

8. An optical information recording and reproducing apparatus as defined in claim 7, wherein said optical information recording material is an opto-magnetic recording material.

9. An optical information recording and reproducing apparatus as defined in claim 7, wherein timecodes are recorded into said information recording material in the CD format and said demodulation means is a CD decoder.

* * * * *